Aug. 18, 1970     M. KETZER     3,524,651

TAPE MAGAZINE LOADING HOLDER AND LOCKING ARRANGEMENT

Filed Oct. 31, 1967     2 Sheets-Sheet 1

INVENTOR.
MANFRED KETZER
BY

AGENT

United States Patent Office 3,524,651
Patented Aug. 18, 1970

3,524,651
TAPE MAGAZINE LOADING HOLDER AND LOCKING ARRANGEMENT
Manfred Ketzer, Vienna, Austria, assignor, by mesne assignments, to U.S. Philips Corporation, New York, N.Y., a corporation of Delaware
Filed Oct. 31, 1967, Ser. No. 679,350
Claims priority, application Austria, Nov. 3, 1966,
A 10,189/66
Int. Cl. B65h 49/06, 75/30; G11b 23/04
U.S. Cl. 274—4
9 Claims

ABSTRACT OF THE DISCLOSURE

A magazine loading holder and locking device for use with a tape transducing apparatus. A sheath-like magazine holder is provided with spring-urged levers to correctly position the magazine in the holder with respect to the tape driving and scanning elements and to provide a magazine ejection force. A locking member is arranged adjacent the holder for retaining the magazine therein against the force of the spring-urged levers.

---

The invention relates to a recording and/or playback apparatus for a tape magazine, and more particularly to a loading holder and locking arrangement into which the tape can be inserted. The loading holder comprises a sheath-like member arranged on the apparatus, having two positions a first position of the holder wherein the magazine is movable into same, and a second lowered position wherein the magazine is placed in operative position relative to tape-driving and tape scanning elements, arranged on the apparatus. It is of particular importance that the magazine when inserted in the holder will assume an exact position which is accurately defined so that after the lowering of the holder of the magazine and the tape driving and scanning elements will be properly aligned. In addition this positioning is important so that when the magazine is taken out of the holder it will not jam.

The invention provides a simple and particularly reliable arrangement for achieving the above-mentioned requirements. The loading holder has a slot in one side of the sheath-like member situated opposite to the aperture for admitting the magazine and also has a slot in a side adjoining said first side and at right angles thereto. Two levers are pivotally journalled on the holder outside the sheath-like member, and the levers have each of their free ends projecting under spring action through the slots and into the sheath-like member. Furthermore, at the magazine entrance aperture of the sheath-like member a releasable locking device is provided which retains the magazine in its inserted position within the holder against the action of the two levers. In this manner the position of the magazine inside the holder is always accurately defined. The lever opposite the aperture, presses the magazine against the locking device and ensures that the magazine will be ejected when released by the locking device. The other lever forces the magazine toward the tape driving and scanning elements on the side of the sheath-like member. The two levers are preferably pivotally journalled about a common shaft. It is of advantage to construct the apparatus so that the two levers are interconnected by means of one spring which forces the levers towards each other and into the sheath-like member. It is also desirable to construct the ends of the levers projecting into the sheath-like member in the form of an arc of a circle to form sliding surfaces.

As already described above, the locking device for retaining the magazine in the holder is of particular importance. The locking device may be constructed so that after inserting the magazine in the holder, the aperture of the sheath-like member is automatically closed with a cover, in such manner that at the end of the inserting operation, a plate is slid in front of the aperture. Preferably, however, a locking member is provided as a locking device which is forced into the aperture of the sheath-like member by means of a spring and which, viewed in the direction of insertion of the magazine, comprises an inclined abutting surface by which it is pushed out of the path of the magazine during the insertion movement of the magazine into the sheath-like member. A lever is provided on the holder in front of said aperture and is constructed as an operating member which is rigidly connected to the locking member and forces the locking member out of the path of the magazine when it is actuated. This locking member has proved of advantage when provided in the plane of the surface supporting the magazine in the holder. Preferably the locking member has approximately the same width as the sheath-like member and is arranged at right angles to the direction of insertion of the magazine.

It has further proved of particular advantage to provide a lock bolt which retains the holder in its first position as soon as the magazine is released and, which also prevents release of the locking device when the holder is lowered. In this manner unwanted lowering of the holder is prevented during the insertion of the magazine into the holder, and when the holder is lowered, the locking of the magazine in the holder thus prevents release of the magazine when the holder is in the lowered position.

A particularly advantageous construction is obtained if a releasing lever constructed as an operating member for releasing the locking device is arranged below the plane of the surface supporting the magazine in the holder and that upon actuation the lever is moved in the direction of the aperture of the sheath-like member. As a result of this movement the operator is forced to operate the lever so that the palm of his hand faces the aperture of the sheath-like member. As a result the operator is automatically prepared for receiving a magazine ejected from the holder so that it cannot fall and be damaged.

Apparatus of this type is often mounted in the dashboard of an automobile, sometimes in combination with radio receivers; consequently the compactness of the apparatus is of decisive importance since the space available is usually limited. In one embodiment, the releasing lever consists of a transparent material behind which at least one indicator device is arranged. The indicator device may be for example, a scale and pointer for a radio receiver or an indicator lamp indicating that the apparatus is ready for use etc.

In order that the invention may be readily carried into effect, a few embodiments thereof will now be described in greater detail, by way of example with reference to the accompanying drawings, in which FIG. 1 is a cross-sectional view of an embodiment of a loading holder.

Figure 1:
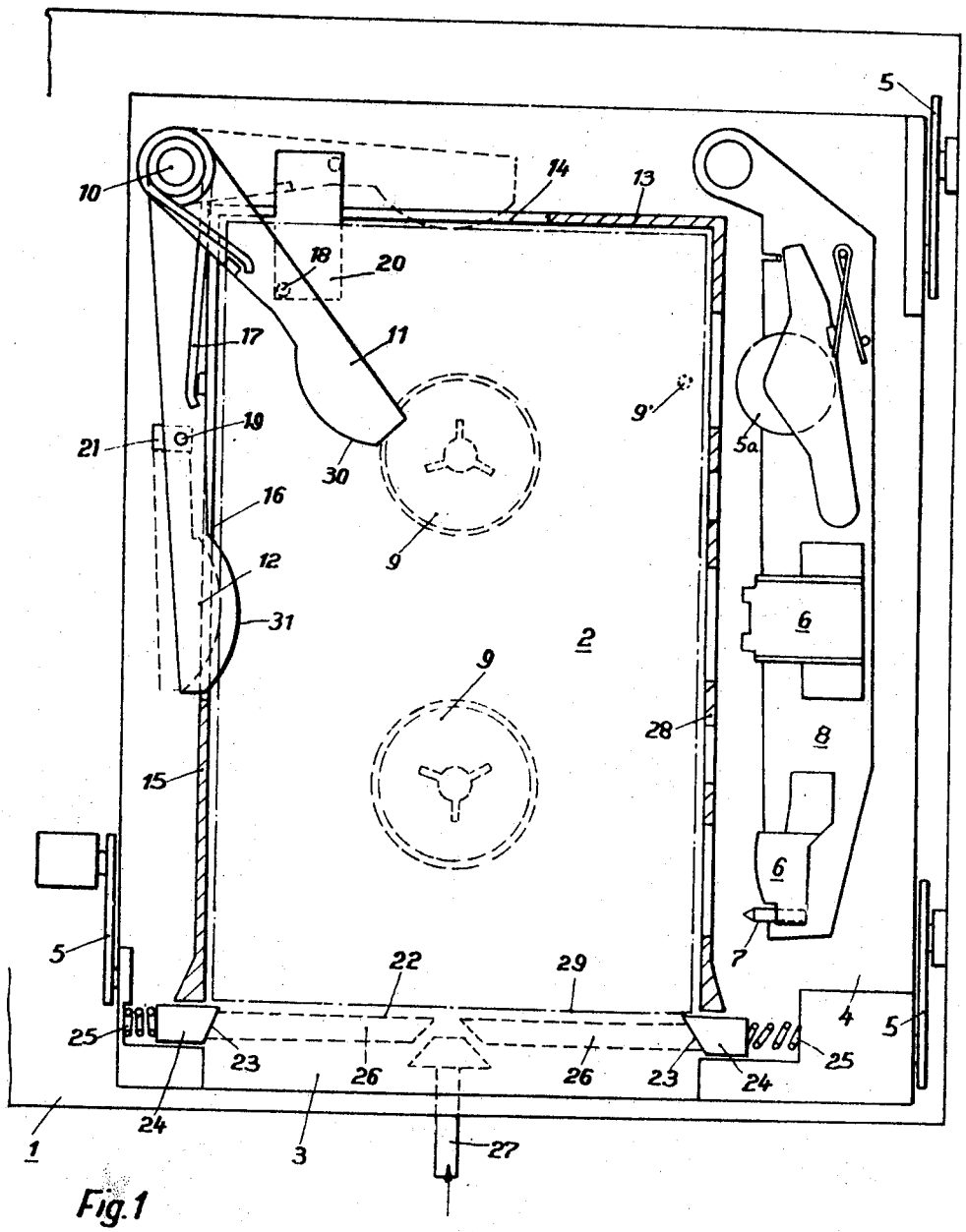

Referring now to FIG. 1, reference numeral 1 denotes a chassis of an apparatus and 2 a loading holder. This holder comprises a sheath-like member 3 into which the magazine can be inserted and a table-like part 4 on which the sheath-like member 3 and structural components operating with said member are arranged. In addition, three levers 5 are pivotally secured to the tabel-like part 4, and rotatably journalled in the chassis of the apparatus. By means of these levers, the loading holder can be lowered from a first position in which a magazine can be inserted into the sheath-like member, to a second position on the chassis of the apparatus, in which position the magazine co-operates with tape driving and scanning elements on the apparatus. The winding spindles and driving shaft upon lowering of the loading holder, are connected to the magazine and enter the magazine. The magnetic head, pressure roller, and record carrier guide, are also moved towards the magazine and enter apertures, to engage the tape. In the present example, a pressure roller 5a, magnetic heads 6 and a tape guide 7 are arranged on a support 8 which is pivotally journalled on the table-like part 4 of the holder and which during the lowering of the holder are moved towards the magazine by means not shown. The winding spindles 9 and the driving shaft 9' which are arranged on the chassis of the apparatus and engage the loading holder and magazine when it is lowered.

In order to insure the connection of these elements to the magazine without interference, it is necessary for the magazine in the sheath-like member 3 of the holder to assume an accurately defined position. In addition it is important that the magazine be securely retained in the holder yet also easily released therefrom.

In order to fulfil these requirements two levers 11 and 12 which pivot about a common shaft 10 are arranged on the table-like part 4 of the holder. The lever 11 projects in the sheath-like member 3 through a slot 14 arranged in the side 13 situated opposite to the aperture of member 3. The lever 12 projects in said member through the slot 16 arranged in the side 15 of same. The two levers 11 and 12 are connected together by means of a spring 17 which forces the levers towards each other and into member 3. To limit the distance of penetration into member 3, pins 18 and 19, respectively, are provided on the levers 11, 12 which pins co-operate with stop members formed by apertures 20, 21 in the table-like part 4.

Furthermore the entrance of the sheath-like member 3 contains a locking device 22. This consists of two locking members 24 which have abutting surfaces 23. When magazine is inserted, surfaces 23 project laterally into the aperture of the sheath-like member 3 and the path of the magazine under the action of springs 25. The locking members 24 furthermore include release members 26 which have inclined surfaces and operating member 27 having a wedge-like end which co-operates with the inclined surfaces so that when said operating member is actuated the locking members 24 will be withdrawn.

The operation of this device is such that when a magazine is inserted manually by a user into the sheath-like member, the two locking members 24 are first forced out of the path of the magazine. When the magazine is further inserted it touches the lever 12 and slides it out of its path. Then it reaches the lever 11 and slides it in front of it, during which movement the spring 17 is tensioned. When the magazine has fully passed the locking members 24, the latter again enters the aperture of the sheath-like member after which the user may release the magazine. As soon as this has happened, the lever 11 forces the magazine against the locking members 24 and the lever 12 forces the magazine against the wall 28 of member 3. This position of a magazine 29 and of the levers 11 and 12 is shown in FIG. 1 by dot- and dash lines and broken lines, respectively.

For taking the magazine out of the holder, the locking members 24 are slid out of the aperture of the sheath-like member 3, by means of the operating member 27 so that the magazine is released after which the lever 11 pushes the magazine out of member 3. In this position the magazine can easily have been taken with the hand and fully drawn out of the holder 2. For a perfect co-operation of the levers 11, 12 with the magazine, said levers comprise sliding surfaces 30 and 31, respectively, which are shaped in the form of an arc of a circle.

Figure 2:
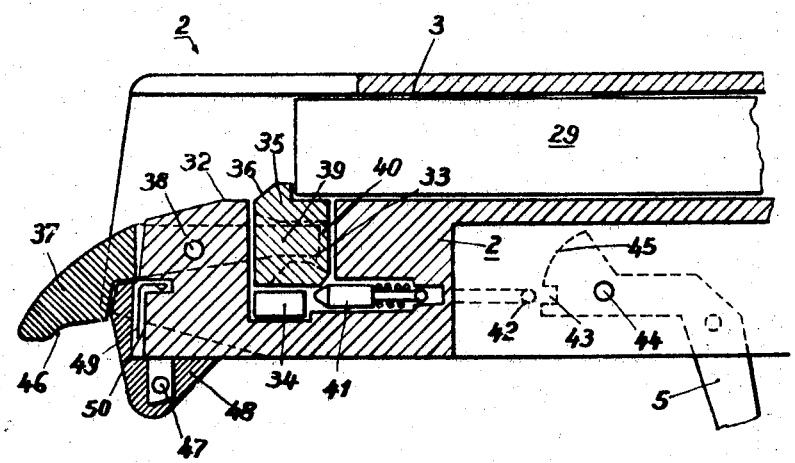
FIG. 2 is a longitudinal cross-sectional view of a locking device for the magazine in the holder.
Figure 3:
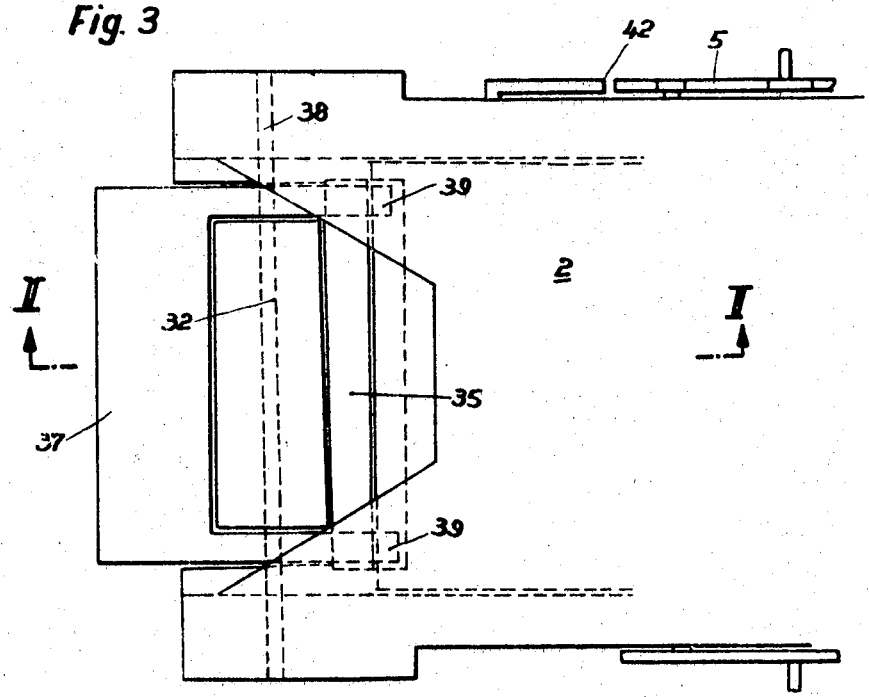
FIG. 3 is a plan view of the device shown in FIG. 2.

FIGS. 2 and 3 show in detail a particularly advantageous locking device for the magazine in the holder 2. In the plane 32 of the surface supporting the magazine 29 in the sheath-like member 3, a recess 33 is provided in which a locking member 35 is arranged and forced into the sheath-like member 3 under the action of a leaf spring 34. The locking member 35 has an abutting surface 36 the same width as sheath 3 and is arranged at right angles to the direction of insertion for the magazine. Furthermore, a lever 37 which is pivotable about the shaft 38 in the direction of the aperture of member 3 is arranged on the holder 2 in front of said aperture below the surface 32 and serves as an operating member. Two arms 39 of the lever project in recesses 40 provided in the locking member 35 so that a rigid connection is formed between the two parts. The locking member 35 co-acts with a lock bolt, which is comprised of a spring-loaded pin 41 having a bent end 42, which projects in front of a recess 43 provided in a circular surface 45 of the lever 5 which lever is affixed to the pivot 44.

When a magazine is inserted into the sheath-like member 3, first of all the locking member 35 is pushed out of the path of the magazine, the pin 41 is shifted so that its end 42 enters the recess 43 of the lever 5 so that said lever is blocked and consequently the holder cannot be lowered. When the magazine is inserted far enough, the locking member 35 is released and pushed into the sheath-like member behind the magazine under the action of the spring 34. The magazine, once inserted is forced against the locking member 35 under the action of the lever 11, as explained with reference to FIG. 1. The locking member 35 offers a sure abutment to the magazine along the width of the member. At the same time the pin 41 is reset in its original position so that the blocking of the lever 5 is removed and the holder with magazine can be lowered. During lowering, the lever 5 is pivoted about the pivot 44 and consequently its circular surface 45 is located in front of the end 42 of the pin. As a result of this the pin 41 and locking member is blocked so that when in the lowered position, the magazine cannot be released by means of the operating member 37.

In order to take a magazine out of the holder, which is possible only in the raised position, the lever 37 is pushed in the direction of the aperture of the sheath-like member. The operator holds the surface 46 with the fingers of one hand so that the lever ends 39 move the locking member 35 and the magazine is released and slid out of the holder 2 under the action of the lever 11. The hand which actuates the lever 37 is automatically directed so that it can catch a magazine falling out of the holder, since the palm of the hand points upwards. In this manner any damage of a magazine which might occur by dropping is avoided.

Preferably the holder 2 simultaneously serves as a support for an indicator, such as a counter, an indicator indicating the readiness for use, or the like, which are useful with the apparatus. This is important where limited space is available, for example, in apparatus for automobiles which is incorporated with a radio receiver. For this purpose the operating member 37 is constructed from a transparent material and the holder can have a part 48 which is also transparent and supports a filament lamp 47, behind which an indicator 49 for a scale 50 of a radio receiver can be placed and incorporated in the apparatus.

What is claimed is:

1. A magazine loading holder for use in a tape transducing apparatus and comprising a sheath member moveably mounted to the apparatus and defining therein at least one aperture for introducing a magazine into said member, said sheath member further being movable between a loading position wherein the magazine is introduced into the holder and an operating position wherein the magazine engages tape driving and transducing means, resilient lever means pivotably mounted to the apparatus and projecting into the sheath member for selectively urging the magazine therein in at least two directions for aligning same with the tape driving and transducing means and for ejecting the magazine from the holder and resilient locking means positioned adjacent the sheath member for releasably retaining the magazine within the sheath.

2. A magazine loading holder as claimed in claim 1, further including a shaft attached to the sheath wherein the lever means includes two levers pivotally journalled to the shaft.

3. A magazine loading holder as claimed in claim 2 wherein the lever means further includes a spring member which urges the two levers toward each other and into the sheath member.

4. A magazine loading holder as claimed in claim 3 wherein the lever members projecting into the sheath member are arc shaped to form a sliding surface.

5. A magazine loading holder as claimed in claim 2 wherein the locking means includes at least one resilient locking member mounted adjacent to the sheath member and having a projecting surface yieldingly blocking the path of the magazine when introduced through the aperture and into the sheath member, said locking member securely retaining the magazine within the sheath member, and an operating member cooperating with the locking member for releasing same by moving the locking member out of the path of the magazine to permit the ejection of the magazine.

6. A magazine loading holder as claimed in claim 5 wherein there are two spring urged locking members on either side of the aperture having inclined surfaces for cooperative movement with the respective magazine upon insertion into the aperture and the operating member upon ejection of the magazine from the sheath member.

7. A magazine loading holder as claimed in claim 5 wherein the locking member extends along the width of the sheath member and is yieldingly urged into the path of the magazine introduced through the aperture and into the sheath member.

8. A magazine loading holder as claimed in claim 7 further having means for coordinating the movement of the operating member with the positioning of the sheath member to thereby prevent release of the locking member and ejection of the magazine when the sheath and magazine are not in the loading position, and including a locking pin for blocking movement of the locking member when the sheath is in the operating position, said pin being displaceable by the locking member to permit movement of the said member when the sheath is in the loading position.

9. A magazine loading holder as claimed in claim 8 wherein the operating member is placed below the aperture in the sheath and is arranged to be pivotally moved in the direction of the aperture to release the magazine.

References Cited

UNITED STATES PATENTS

| | | | |
|---|---|---|---|
| 2,969,929 | 1/1961 | Rudzitis | 179—100.2 |
| 3,083,269 | 3/1963 | Gaubert | 242—55.19 |
| 3,146,316 | 8/1964 | Knoth | 179—100.2 |
| 3,167,267 | 1/1965 | Crane | 274—11 |
| 3,385,534 | 5/1968 | Starr | 274—4 |
| 3,395,871 | 8/1968 | Ackermann et al. | 274—4 |

FOREIGN PATENTS

| | | |
|---|---|---|
| 1,042,025 | 9/1966 | Great Britain. |

JAMES W. MOFFITT, Primary Examiner

R. S. TUPPER, Assistant Examiner

U.S. Cl. X.R.

179—100.2; 242—198